(12) United States Patent
Welter

(10) Patent No.: US 12,447,845 B2
(45) Date of Patent: Oct. 21, 2025

(54) AUTOMATED INSTALLATION FOR CHARGING ELECTRICAL VEHICLES

(71) Applicant: Bayerische Motoren Werke Aktiengesellschaft, Munich (DE)

(72) Inventor: Andreas Welter, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 73 days.

(21) Appl. No.: 18/286,802

(22) PCT Filed: Feb. 28, 2022

(86) PCT No.: PCT/EP2022/054969
§ 371 (c)(1),
(2) Date: Oct. 13, 2023

(87) PCT Pub. No.: WO2022/218598
PCT Pub. Date: Oct. 20, 2022

(65) Prior Publication Data
US 2024/0198832 A1    Jun. 20, 2024

(30) Foreign Application Priority Data
Apr. 14, 2021 (DE) ............... 10 2021 109 305.8

(51) Int. Cl.
*B60L 53/10* (2019.01)
*B60L 53/00* (2019.01)
(Continued)

(52) U.S. Cl.
CPC .............. *B60L 53/36* (2019.02); *B60L 53/62* (2019.02); *B60L 53/67* (2019.02); *B60L 58/12* (2019.02); *E04H 6/34* (2013.01); *E04H 6/424* (2013.01)

(58) Field of Classification Search
CPC ..... Y02T 90/14; Y02T 90/16; Y02T 10/7072; Y02T 10/70; Y02T 90/12; Y02T 10/72;
(Continued)

(56) References Cited

U.S. PATENT DOCUMENTS 9,779,365 B2 * 10/2017 Smullin ................ G06Q 10/02
9,975,446 B2 *  5/2018 Weber ..................... B60L 53/62
(Continued)

FOREIGN PATENT DOCUMENTS

CN          107338998 A    11/2017
DE   10 2009 047 504 A1    6/2011
(Continued)

OTHER PUBLICATIONS

International Search Report (PCT/ISA/210) issued in PCT Application No. PCT/EP2022/054969 dated Jul. 4, 2022 with English translation (4 pages).
(Continued)

*Primary Examiner* — Rexford N Barnie
(74) *Attorney, Agent, or Firm* — Crowell & Moring LLP

(57) ABSTRACT

An installation for charging electrical energy storage devices of motor vehicles includes a plurality of charging stations by way of which the energy storage devices can be supplied with electrical energy and thus charged. The installation also includes a conveying system by way of which each motor vehicle can be automatically conveyed from a collection region spaced apart from the charging stations to the relevant charging station, from at least a first charging station of the charging stations to at least a second charging station of the charging stations and from the relevant charging station to a waiting region spaced apart from the charging stations and from the collection region.

11 Claims, 1 Drawing Sheet

(51) Int. Cl.
  *B60L 53/30* (2019.01)
  *B60L 53/36* (2019.01)
  *B60L 53/62* (2019.01)
  *B60L 53/67* (2019.01)
  *B60L 58/12* (2019.01)
  *E04H 6/12* (2006.01)
  *E04H 6/18* (2006.01)
  *E04H 6/22* (2006.01)
  *E04H 6/34* (2006.01)
  *E04H 6/42* (2006.01)

(58) Field of Classification Search
  CPC ...... B60L 53/30; B60L 53/35; B60L 2250/16; B60L 53/14; B60L 53/36; B60L 53/62; B60L 53/67; B60L 58/12; B60L 53/11; E04H 6/34; E04H 6/424; E04H 6/42; E04H 6/422
  USPC ............... 320/109, 104, 128, 132, 134, 127; 307/9.1, 10.1; 701/118, 119; 180/65.21, 180/65.29
  See application file for complete search history.

(56) References Cited

U.S. PATENT DOCUMENTS

| | | |
|---|---|---|
| 2012/0013301 A1 | 1/2012 | Gaul et al. |
| 2012/0306446 A1 | 12/2012 | Suganuma et al. |
| 2018/0001777 A1 | 1/2018 | Kilic |
| 2020/0009977 A1 | 1/2020 | Park |
| 2020/0269426 A1 | 8/2020 | Shikano et al. |
| 2021/0023955 A1 | 1/2021 | Schiess et al. |

FOREIGN PATENT DOCUMENTS

| | | | |
|---|---|---|---|
| DE | 10 2014 226 357 A1 | 6/2016 | |
| DE | 10 2017 214 647 A1 | 2/2019 | |
| EP | 2 404 358 B1 | 9/2014 | |
| EP | 3628797 A1 * | 4/2020 | ............. B60L 53/30 |
| JP | 5553106 B2 | 7/2014 | |
| WO | WO 2010/060720 A2 | 6/2010 | |
| WO | WO 2015/145067 A1 | 10/2015 | |

OTHER PUBLICATIONS

German-language Written Opinion (PCT/ISA/237) issued in PCT Application No. PCT/EP2022/054969 dated Jul. 4, 2022 with English translation (9 pages).

German Search Report issued in German Application No. 10 2021 109 305.8 dated Dec. 9, 2021 with partial English translation (11 pages).

* cited by examiner

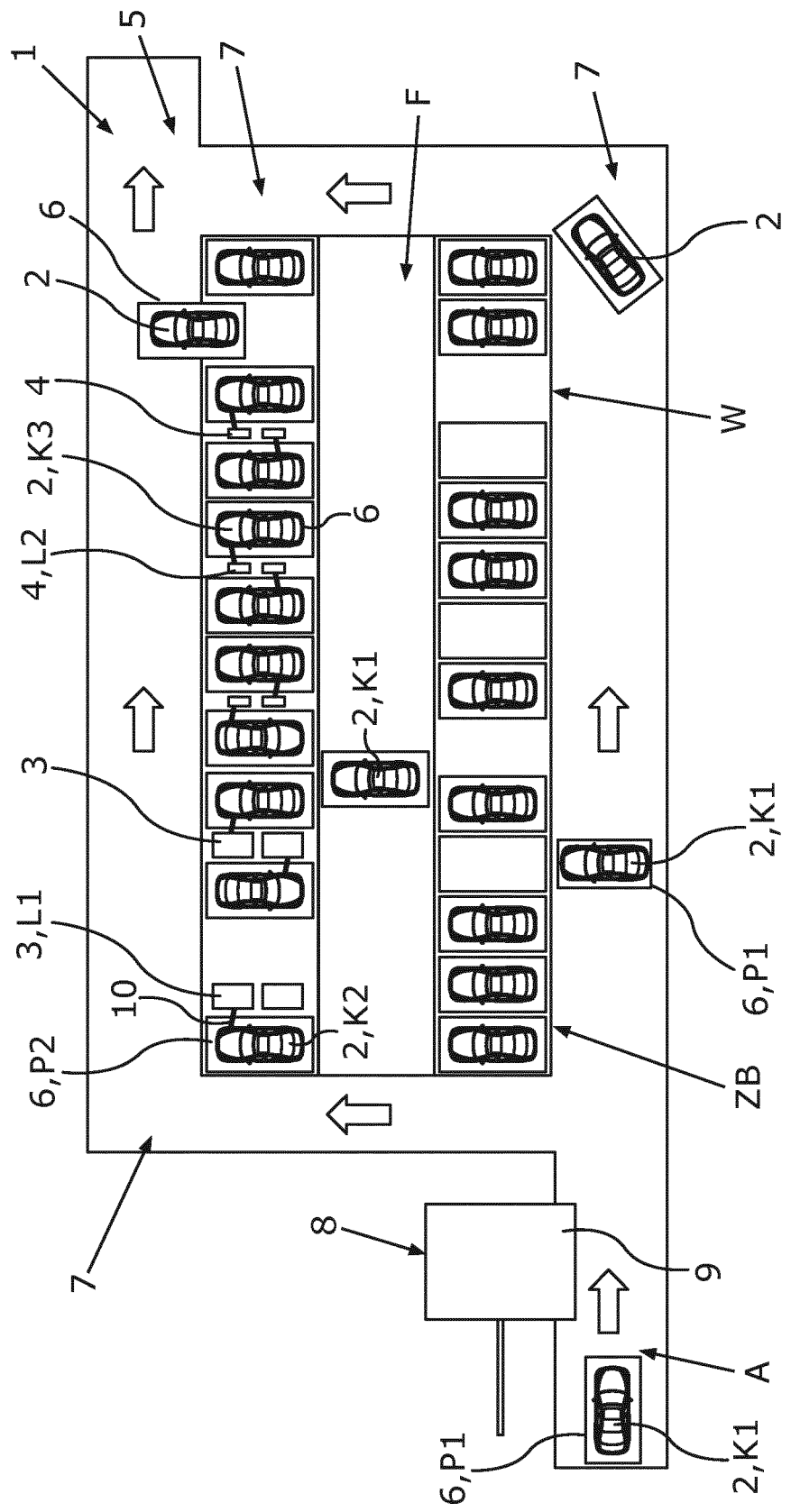

AUTOMATED INSTALLATION FOR CHARGING ELECTRICAL VEHICLES

BACKGROUND AND SUMMARY

The invention relates to an installation for charging electrical energy storage units of motor vehicles including a plurality of charging stations by way of which the energy storage units are suppliable with electrical energy and are thereby chargeable. The invention furthermore relates to a method for charging electrical energy storage units of motor vehicles wherein the energy storage units are supplied with electrical energy by way of a plurality of charging stations of an installation and are charged by way of the plurality of charging stations.

JP 5553106 B2 discloses an energy supply control device that controls a supply of energy to a charging station and has a control apparatus for controlling an amount of energy that should be supplied to the charging station. DE 10 2014 226 357 A1 discloses a charging station for automatically charging an electrical energy storage unit in a vehicle. EP 2 404 358 B1 furthermore discloses a method for charging electric vehicles. Moreover, WO 2010/060720 A2 discloses a method for automatically charging fully or partially electrically operated vehicles. The respective vehicle starts at any starting point in a transfer area, and the respective vehicle actuates a selected charging location in a self-controlled manner.

The object of the present invention is to provide an installation and a method for charging electrical energy storage units of motor vehicles, such that the energy storage units are able to be charged in a particularly time-efficient manner, wherein the motor vehicles do not have to have any self-control capability.

This object is achieved according to the invention by an installation and by a method having the features of the claimed invention.

A first aspect of the invention relates to an installation, also referred to as device or in the form of a device, for charging electrical energy storage units, in particular batteries, of motor vehicles. The installation has a plurality of charging stations by way of which the respective energy storage units are able to be supplied with electrical energy and are to be charged thereby. In this case, the charging stations are preferably individual single apparatuses that are arranged next to one another and possibly at a distance from one another and which, in particular in their entirety, form the installation or are part of the installation.

In order then to be able to charge the energy storage units in a particularly time-efficient manner, provision is made according to embodiments of the invention that the installation has a conveyor system, also referred to as conveyor apparatus or in the form of a conveyor apparatus, by way of which the respective motor vehicle, preferably in the form of a car and more preferably in the form of a passenger car, is to be conveyed, that is to say is able to be conveyed, automatically from a pickup area at a distance from the charging stations to the respective charging station, from at least a first of the charging stations to at least a second of the charging stations and from the respective charging station to a waiting area of the installation at a distance from the charging stations and from the pickup area. The pickup area is also referred to for example as transfer area into which the respective motor vehicle is able to be driven, for example by the respective driver of the respective motor vehicle. By way of the conveyor system, the respective motor vehicle may for example be conveyed automatically from the pickup area to such a charging station that is free or has become free and has been determined for example as being particularly advantageous for charging the energy storage unit of the motor vehicle. The conveyor system may furthermore convey the respective motor vehicle automatically from the first charging station to the second charging station. The respective energy storage unit may thus for example first, and in particular during a first time interval, be charged by way of the first charging station and then, in particular during a second time interval following the first time interval, be charged by way of the second charging station. The background here is that for example, during the first time interval, the first charging station is more suitable than the second charging station for charging the energy storage unit, while for example during the second time interval, the second charging station is more suitable than the first charging station for charging the energy storage unit, or during the second time interval it is no longer possible to make full use of a potential, such as for example a maximum charging power of the first charging station, to charge the energy storage unit during the second time interval as well. Thus, during the second time interval, the energy storage unit may be charged by way of the second charging station such that for example, during the second time interval, the first charging station may be used to charge another one of the energy storage units particularly quickly. The conveyor system furthermore makes it possible to convey the respective motor vehicle from the respective charging station to the waiting area, for example when its energy storage unit is fully charged or has been charged at least enough that a current state of charge of the energy storage unit, resulting from the charging, exceeds a for example predefinable or predefined charging level. This is particularly advantageous when the driver of the respective motor vehicle does not drive the respective motor vehicle away from the respective charging station after the energy storage unit has been charged fully sufficiently. Since the motor vehicle is then able to be conveyed away from the respective charging station and conveyed to the waiting area, it is possible to avoid blocking of the respective charging station by a vehicle having a fully or at least sufficiently charged energy storage unit. The respective charging station may thereby be freed up, in other words made available to a further motor vehicle or to a further energy storage unit in order to charge the further energy storage unit. The motor vehicle having the fully or sufficiently charged energy storage unit may then be picked up by the driver in the waiting area and driven out of the waiting area. The invention thus makes it possible to achieve particularly advantageous vehicle logistics at or in the installation, such that the charging stations of the installation are able to be used in a particularly advantageous manner in order to be able to charge a large number of energy storage units of motor vehicles particularly quickly, in particular including at what are known as congestion times, at which a particularly large number of drivers of motor vehicles wish to charge their energy storage units.

The invention is based in this case in particular on the following findings and observations: At conventional installations for charging energy storage units of motor vehicles, it is possible to observe longer waiting times at congestion times, such as for example during holidays, since installations having a plurality of charging stations for charging energy storage units of motor vehicles, and thus a charging infrastructure, are not normally designed to be able to charge all energy storage units simultaneously or at least such that excessive waiting times do not occur also at congestion times that are able to be determined for example empirically and/or through simulation, at which congestion times a large number of drivers of motor vehicles equipped with electrical energy storage units wish to charge the electrical energy storage units, in other words without the drivers having to wait for a long time or even at all to reach a free charging station and to charge the energy storage unit by way thereof. Such a design of a charging infrastructure would be too complex and economically unjustifiable. It is therefore often the case in conventional installations that each driver has to join a queue with their motor vehicle and wait until a charging station becomes free for them, at which they are able to charge their energy storage unit. One reason for this is in particular that most motor vehicles do not have an automated driving function by way of which the motor vehicles are able to drive automatically, that is to say without being driven by a driver, to a charging station that is free or has become free. The motor vehicles therefore have to be driven by people, accordingly by their drivers, to the respective charging station. The presence of the driver in the respective motor vehicle is therefore necessary to drive the motor vehicle to the respective charging station. This required presence of the driver in the motor vehicle results in a large amount of time that the driver has to spend in the motor vehicle, but could use in a considerably more expedient manner outside the motor vehicle than waiting in a queue for a charging station to become free. Furthermore, a time needed for the charging, also referred to as charging process or that takes place in a charging process, is usually difficult or impossible to plan. It is usually not possible to calculate a time required for the charging process, either on site at the installation or by the installation or using a digital route-planning and/or charging-planning system. A further disadvantage or a further problem from the prior art may also be the fact that a cost-intensive fast-charging infrastructure, that is to say fast-charging stations that are able to charge energy storage units with a very high charging power, are usually not used efficiently. If a driver does not drive their motor vehicle away immediately after the charging process has ended, since the driver has for example started an activity during the charging process that has not yet ended after the charging process has ended, the motor vehicle having the fully or sufficiently charged energy storage unit blocks the charging station, which is particularly disadvantageous when the charging station is in the form of a fast-charging station. Valuable time in which no energy storage unit is able to be charged is lost during the blockage.

A further finding on which the invention is based is that the highest possible charging power with which an energy storage unit is able to be charged by way of a charging station decreases as state of charge increases, that is to say as the amount of electrical energy stored in the energy storage unit increases. If for example a charging station in the form in particular of a fast-charging station has a maximum charging power of for example 350 kilowatts, then for example the respective energy storage unit is able to be charged by way of the charging station with this maximum charging power only as long as the state of charge of the energy storage unit is below a limit. Above the limit, the charging station is no longer able to charge the energy storage unit with its maximum charging power, but rather only at most with a charging power lower than the maximum charging power. A fast-charging station would then however not be used effectively and efficiently.

The abovementioned disadvantages and problems may then be solved by the invention, in particular by virtue of the fact that the motor vehicles are able to be moved automatically and as needed by way of the conveyor system, in particular from the pickup area to the respective charging station, from charging station to charging station and from the respective charging station to the waiting area. The charging stations may thereby be used effectively and efficiently, in particular with regard to their maximum charging power, such that it is also possible to charge a particularly high number of energy storage units in a short time, in particular fully or at least sufficiently, by way of the installation according to embodiments of the invention.

The conveyor system is in particular designed such that the conveyor system allows the respective driver of the respective motor vehicle, also referred to simply as vehicle, to leave the motor vehicle such that the driver is able to spend their time outside the motor vehicle in a more expedient manner. By way of the conveyor system, the motor vehicle may thus be moved as needed while the driver is located outside the motor vehicle. Automatic conveying of the respective motor vehicle should thus be understood to mean that the conveyor system is able to convey the respective motor vehicle without involvement of the driver and without the driver remaining in the motor vehicle. The conveyor system makes it possible in particular to convey and thus to move the motor vehicles at least almost without delay to respective locations of the installation, also referred to as system, at which it is advantageous to situate the motor vehicles in order to optimize, that is to say to be able to perform in a particularly time-efficient manner, an overall sequence for charging the energy storage units. The invention makes it possible in particular to avoid excessively long blockages of charging stations by motor vehicles having sufficiently or fully charged energy storage units.

In one particularly advantageous embodiment of the invention, the conveyor system has at least one conveyor platform that is able to be moved at least translationally and preferably also rotationally from the pickup area to the respective charging station, from the first charging station to the second charging station and from the respective charging station to the waiting area, and that is also referred to as or may be in the form of a conveyor pallet or pallet. The respective motor vehicle is able to be parked on the conveyor platform and thereby, while it is located on the conveyor platform, be conveyed at least translationally and preferably also rotationally from the pickup area to the respective charging station, from the first charging station to the second charging station and from the respective charging station to the waiting area by way of the conveyor platform. In other words, the respective driver of the respective motor vehicle is able to park their motor vehicle on the conveyor platform, which is in particular first located in the pickup area, accordingly park on the conveyor platform and for example then leave their motor vehicle. While the driver, also referred to as user, is located outside their motor vehicle, the conveyor platform is able to convey the motor vehicle parked on the conveyor platform automatically from the pickup area to the respective charging station. By way of example, one of the charging stations from the charging stations of the installation is selected by way of the installation, in particular by way of an electronic computing apparatus of the installation, and the motor vehicle is conveyed to the selected charging station by way of the platform. Once the motor vehicle located on the conveyor platform has been conveyed to the selected charging station, the motor vehicle is charged by way of the selected charging station. The selected charging station is for example the abovementioned first charging station. If the energy storage unit of the motor vehicle is charged by way of the selected charging station such that the energy storage unit is fully charged or that a current state of charge of the energy storage unit, resulting in particular from the charging, is greater than a for example predefined or predefinable level, then the motor vehicle is moved for example from the selected charging station to the waiting area by way of the platform, from which waiting area the driver is able to pick up the motor vehicle and drive it away. By way of example, the motor vehicle is charged by way of the selected charging station while the motor vehicle is located on the conveyor platform.

If it is determined for example that a maximum possible charging power with which the motor vehicle is able to be charged at most by way of the selected charging station falls below a limit that is for example lower than the maximum charging power of the selected charging station, and if the energy storage unit is however not yet fully charged or the current state of charge has not yet reached or not yet exceeded the level, then the motor vehicle is conveyed for example from the selected charging station (first charging station) to the second charging station by way of the conveyor platform. The energy storage unit of the motor vehicle is charged, in particular while the motor vehicle is located on the conveyor platform, at or by way of the second charging station in particular such that or until the energy storage unit of the motor vehicle is fully charged or has reached or exceeded the abovementioned level. While the energy storage unit is being charged by way of the second charging station, the first charging station may be used to charge a second of the energy storage units. If the energy storage unit has been charged sufficiently by way of the second charging station, such that the energy storage unit is fully charged or such that the current state of charge reaches or exceeds the level, and if for example the motor vehicle is not driven away immediately from the second charging station by its driver, the motor vehicle is for example conveyed from the second charging station to the waiting area by way of the conveyor platform. As an alternative, it is conceivable for the driver, for example when the energy storage unit has been charged fully or at least such that the state of charge of the energy storage unit exceeds or reaches the level by way of the first charging station or by way of the second charging station, to drive away immediately from the first charging station or from the second charging station, such that the motor vehicle then is not, or does not have to be, conveyed to the waiting area by way of the conveyor platform. If it is however determined that the driver, after the charging process at the first or second charging station has ended, does not drive the motor vehicle away from the first or second charging station immediately or within a waiting time interval, then the motor vehicle is conveyed from the first or second charging station to the waiting area by way of the conveyor platform. Excessively long blockage of the charging station may thereby be avoided, and the charging station may be made available again particularly quickly to a further energy storage unit.

A further embodiment is distinguished in that the first charging station is in the form of a fast-charging station that has a maximum charging power for charging the respective energy storage unit. It has proven to be particularly advantageous here when the second charging station has a second maximum charging power, lower than the first maximum charging power, for charging the respective energy storage unit. Preferably, the second maximum charging power is at least 100 kilowatts, in particular at least 200 kilowatts, lower than the first maximum charging power. The second charging station is thus for example in the form of a normal charging station. According to embodiments of the invention, provision is thus made for a combination of fast and normal charging infrastructure, by way of which the charging processes for charging the energy storage units are performed. This makes it possible to achieve particularly high efficiency of the installation, such that the installation allows the energy storage units to be charged in both a time-efficient and an inexpensive manner. Such a combination of fast and normal charging infrastructure allows particularly efficient use of the fast-charging infrastructure, accordingly of the fast-charging station. If for example the respective energy storage unit has been charged by way of the fast-charging station such that the state of charge of the respective energy storage unit is no longer able to be charged with the first maximum charging power, but rather at most with a charging power considerably lower than this, then this may be determined by the installation, and the motor vehicle having the energy storage unit may be conveyed automatically from the fast-charging station to the normal charging station by way of the conveyor system, at which normal charging station it is possible to finish charging of the energy storage unit. Cost-intensive fast-charging stations may thereby be used effectively and efficiently, and it is possible at the same time also to charge a particularly high number of energy storage units in a particularly time-efficient manner.

In a further particularly advantageous embodiment of the invention, the installation, in particular the electronic computing apparatus, is designed to determine a respective actual state of charge of the respective energy storage unit. The actual state of charge may be understood in particular to mean an actual state of charge of the energy storage unit prior to charging of the energy storage unit. The installation, in particular the electronic computing apparatus, is thus for example designed in particular to determine a respective actual state of charge of the respective energy storage unit prior to charging of the respective energy storage unit. Furthermore, the actual state of charge may be an actual state of charge of the respective energy storage unit during charging of the respective energy storage unit, that is to say a state of charge of the respective energy storage unit resulting from the charging. The installation, in particular the electronic computing apparatus, is thus preferably designed, during charging of the respective energy storage unit, to determine an in particular current respective actual state of charge of the respective energy storage unit. Furthermore, the actual state of charge may be for example an actual state of charge of the respective energy storage unit after charging, such that for example the installation, in particular the electronic computing apparatus, is designed to determine a respective actual state of charge of the respective energy storage unit after charging of the respective energy storage unit. The actual state of charge is thus for example an in particular current state of charge of the respective energy storage unit and/or a state of charge of the respective electrical energy storage unit determined by the installation at a point in time. Depending on the determined actual state of charge, the motor vehicles may be conveyed and thus moved particularly advantageously and as needed by way of the conveyor system. The charging stations may thus in particular be used effectively and efficiently to charge the energy storage unit as needed. By way of example, the actual state of charge is determined, in particular detected, when the respective motor vehicle is driven up to or enters the respective charging station. By way of example, the respective actual state of charge may be measured and/or calculated, in particular by way of the respective charging station. It is also conceivable for the actual state of charge to be determined on the basis of an input performed by the respective driver. By way of example, the installation, in particular the charging station, has an input apparatus by way of which a person, such as for example the respective driver of the respective motor vehicle, is able to perform an input, in particular into the installation. By way of example, an input made by the person or the driver is detected by way of the input apparatus, wherein the actual state of charge is determined on the basis of the input. In summary, the driver may for example input the actual state of charge. It is also conceivable for the respective motor vehicle to provide an information signal that characterizes the current actual state of charge of the respective energy storage unit. The installation may receive the information signal and thereby determine the actual state of charge.

It has also proven to be particularly advantageous when the installation, in particular the electronic computing apparatus, is designed to determine a respective target state of charge of the respective energy storage unit. The target state of charge is for example a state of charge different from the actual state of charge and greater than the actual state of charge and which is intended to be reached or achieved, in particular starting from the actual state of charge, through the respective charging, that is to say through the respective charging process. By way of example, when the driver does not perform any specific inputs, it is possible to use a respective maximum state of charge of the respective energy storage unit as the target state of charge. It is furthermore conceivable for the driver to specify the target state of charge, in particular through an input via the input apparatus, and it is thus conceivable for at least one input made by the driver to be detected by way of the input apparatus of the installation, on the basis of which input the target state of charge is determined. Determining the target state of charge enables particularly advantageous planning of the charging processes, such that the energy storage units are able to be charged in a particularly time-efficient manner.

A further embodiment is distinguished in that the installation, in particular the electronic computing apparatus, is designed to determine a current actual charging power with which the respective energy storage unit is currently being charged by way of the respective charging station. The determined current actual charging power is for example information or a measured value on the basis of which the following logic could for example be implemented: As soon as the current actual charging power with which for example one of the energy storage units is currently being charged by way of the second charging station (normal charging station) falls below the second maximum charging power of the second charging station, the one energy storage unit may continue to be charged there, that is to say by way of the second charging station, accordingly remain at the second charging station and does not have to be transported to the first charging station (fast-charging station), since the first maximum charging power of the fast-charging station, which is higher than the second maximum charging power of the normal charging station, is no longer able to be used to charge the one energy storage unit faster than by way of the normal charging station. Unnecessary transport of the respective motor vehicle may thus be avoided.

It has proven to be particularly advantageous here when the installation is designed to convey the respective motor vehicle automatically from the pickup area to the respective charging station and/or from the first charging station to the second charging station and/or from the respective charging station to the waiting area by way of the conveyor system on the basis of the actual state of charge and/or on the basis of the target state of charge and/or on the basis of the actual charging power. This makes it possible to achieve needs-oriented positioning of the respective motor vehicle at a respective location, such as for example the respective charging station and the waiting area, such that the charging stations are able to be used effectively and efficiently, and such that excessively long blockages of charging stations are able to be avoided. If it is determined for example on the basis of the actual state and possibly on the basis of the target state of charge that a difference between the actual state of charge and the maximum state of charge of the respective energy storage unit or a difference between the actual state of charge and the target state of charge is so low that the energy storage unit is able to be brought from the actual state of charge to the target state of charge by a normal charging station as well, accordingly by the second charging station, that is currently free, such that the energy storage unit is able to be brought from the actual state of charge to the target state of charge by being charged by way of the normal charging station faster or just as fast as if it were waiting for a fast-charging station to become free and for the energy storage unit to be charged by way of the fast-charging station, then the motor vehicle is for example conveyed automatically from the pickup area to the normal charging station (second charging station) by way of the conveyor system. The same may be performed to convey the motor vehicle from the first charging station to the second charging station. Thus, for example, one of the energy storage units may first be brought to a high state of charge in a short time by way of the fast-charging station, after which charging of the one energy storage may be finished by way of the normal charging station, while a further one of the energy storage units is brought to a high state of charge by way of the fast-charging station. This makes it possible to achieve revolver-like or magazine-like charging of the energy storage units, such that the installation is able to be designed and operated particularly economically, and such that a particularly high number of energy storage units are also able to be charged in a time-efficient manner.

If it is determined for example that the respective energy storage unit has the target state of charge, and the motor vehicle is then not driven away by the driver immediately or within a waiting time, then the motor vehicle is transported automatically to the waiting area by way of the conveyor system. This makes it possible to reliably avoid excessively long blockages of charging stations. In a further particularly advantageous embodiment of the invention, the installation, in particular the electronic computing apparatus, is designed, at least on the basis of the actual state of charge and on the basis of the target state of charge and preferably also on the basis of the current actual charging power, to determine a charging time that is necessary to bring the actual state of charge to the target state of charge by way of the charging, accordingly to charge the energy storage unit such that it has or reaches the target state of charge, in particular starting from the actual state of charge. The charging time is information on the basis of which the motor vehicles are able to be distributed to the charging stations in a particularly needs-oriented manner and the respective driver is able to plan their time expediently outside the vehicle, in particular during charging. Digital route planners and/or charging planners may also, taking into consideration the current charging times, select, from the charging stations, those of the charging stations that have been determined as being particularly advantageous with regard to the respective energy storage unit, in particular with regard to the fact that the energy storage units may be charged in a particularly time-efficient manner by way of the installation.

Provision is thus made for example for the respective motor vehicle to be conveyed automatically from the pickup area to the respective charging station by way of the conveyor system and/or to be conveyed automatically from the first charging station to the second charging station by way of the conveyor system on the basis of the determined charging time. Provision may in particular be made for the respective charging station to be selected on the basis of the determined charging time. It has also proven to be particularly advantageous when the installation, in particular the electronic computing apparatus, is designed to determine a respective, in particular current charging power with which the respective energy storage unit is charged, in particular currently being charged, by way of the respective charging station.

It has proven to be particularly advantageous here when the installation is designed to convey the respective motor vehicle from the pickup area to the respective charging station and/or from the first charging station to the second charging station by way of the conveyor system on the basis of the determined, in particular current charging time. This allows particularly efficient use of the charging infrastructure, in particular of the fast-charging station. The invention makes it possible for example to move the respective motor vehicle automatically from the fast-charging station to the normal charging station, which is less expensive than the fast-charging station, by way of the conveyor system when it is determined for example that the charging power does not correspond or no longer corresponds to the first maximum charging power or is lower than a for example predefined or predefinable limit value or when for example a difference between the determined, current charging power with which the energy storage unit is currently being charged and the first maximum charging power exceeds an in particular predefinable or predefined limit. This makes it possible to make the fast-charging station available to an energy storage unit that is able to be charged with the first maximum charging power or at least almost with the first maximum charging power, such that the energy storage units are able to be charged in a particularly time-efficient manner overall.

In a further particularly advantageous embodiment of the invention, the installation, in particular the electronic computing apparatus, is designed to transmit the determined charging time to at least one device external to the installation, in particular wirelessly. The external device may be for example a navigation system of a motor vehicle or of one of the motor vehicles or a mobile terminal of a user, such as for example one of the drivers, such that the charging time is able to be communicated to the navigation system or the mobile terminal. The navigation system may for example plan a route accordingly, in particular such that the motor vehicle for example arrives at the pickup area such that a waiting time, following which the motor vehicle is able to be conveyed to one of the charging stations by way of the conveyor system, is as short as possible or even zero. Transmitting the charging time to the mobile terminal makes it possible for example to inform the respective driver, located outside the respective motor vehicle, about the for example remaining charging time. The driver may then plan their time outside the motor vehicle accordingly on the basis thereof.

A further embodiment is distinguished in that the installation is designed to transmit data to at least one mobile terminal external to the installation, in particular wirelessly, which data characterize a current state of the respective motor vehicle during charging of the energy storage unit of the respective motor vehicle. By way of example, the current state comprises the determined current actual state of charge, such that the respective driver, while they are located outside the motor vehicle, is able to recognize or call up the respective current actual state of charge during charging via their mobile terminal. Based thereon, the driver is able to drive the motor vehicle away from the respective charging station immediately after the charging process has ended or within the waiting time. If this does not occur, that is to say if for example the motor vehicle is not driven away from the charging station by the driver after the charging process has ended and within the waiting time, then the motor vehicle is conveyed automatically from the charging station to the waiting area by way of the conveyor system. The driver may then drive away their motor vehicle from there. It is conceivable in particular for the state to comprise a current position of the respective motor vehicle. It is thus possible for example to communicate to the driver the location at which or the area of the installation at or in which the motor vehicle is currently located. The driver therefore does not have to undertake a complicated search for their motor vehicle.

Finally, it has proven to be particularly advantageous when the installation has at least one output apparatus arranged at or in the pickup area, by way of which it is possible to output an optical signal, that is to say a signal perceptible to the human eye and also referred to as information signal, that characterizes a starting time at which the charging of the energy storage unit of the motor vehicle currently located in the pickup area will begin. The driver, who is still located for example in the motor vehicle, may thus be informed about the starting time, such that the driver is able to estimate how long they still have to wait until the charging process begins. The driver is thereby able to plan their time outside the motor vehicle particularly well.

A second aspect of the invention relates to a method for charging electrical energy storage units of motor vehicles. The respective energy storage unit is preferably a battery, in particular a high-voltage battery. The respective energy storage unit is preferably a high-voltage component the voltage, in particular operating or nominal voltage, of which is preferably greater than 50 volts, in particular greater than 60 volts, and very preferably several hundred volts. The motor vehicle may be a hybrid or electric vehicle, in particular a battery electric vehicle (BEV). In the method, the energy storage units are supplied with electrical energy by way of a plurality of charging stations of an installation, in particular in accordance with the first aspect of the invention, and charged thereby, in particular such that the electrical energy is stored in the energy storage units. Provision is made in the method in particular for at least two of the energy storage units to be charged at the same time by way of the charging stations and thus by way of the installation, such that for example a first of the energy storage units is charged by way of a first of the charging stations and at the same time a second of the energy storage units is charged by way of a second of the charging stations.

In order then to be able to charge the energy storage units in a particularly time-efficient manner, provision is made according to embodiments of the invention for the respective motor vehicle to be conveyed automatically from a pickup area at a distance from the charging stations to the respective charging station, from the first charging station to the second charging station and from the respective charging station to a waiting area at a distance from the charging stations and from the pickup area by way of a conveyor system of the installation. Advantages and advantageous embodiments of the first aspect of the invention should be considered to be advantages and advantageous embodiments of the second aspect of the invention and vice versa.

In order to charge the respective energy storage unit of the respective motor vehicle by way of the respective charging station, the respective energy storage unit or the respective motor vehicle is at least electrically connected to the respective charging station, in particular via at least one cable. Using the cable, the charging station is able to provide the electrical energy for charging the respective energy storage unit, accordingly transmit said energy to the respective energy storage unit. It is conceivable here for the respective energy storage unit to be connected to the respective charging station or to the respective cable and, via this, to the respective charging station manually, and in this case for example by the respective driver. Or, the respective charging station, in particular the respective cable and, via the respective cable, the respective charging station is at least electrically connected to the respective energy storage unit automatically by way of the installation, for example. The energy storage units may thereby be charged in a particularly time-efficient manner.

Further details of the invention will become apparent from the following description of one preferred exemplary embodiment with the associated drawing.

BRIEF DESCRIPTION OF THE DRAWING

FIG. 1 shows a schematic illustration of an installation according to an exemplary embodiment of the invention for charging electrical energy storage units of motor vehicles.

DETAILED DESCRIPTION OF THE DRAWING

FIG. 1 shows a schematic illustration of an installation 1 for charging electrical energy storage units of motor vehicles 2. In the exemplary embodiment shown in FIG. 1, the respective motor vehicle 2, which is also referred to simply as vehicle, is a car, in particular a passenger car. The installation 1 has charging stations 3 and 4 by way of which the respective energy storage units of the respective motor vehicles 2 are able to be supplied with electrical energy and are to be charged thereby.

In order then to be able to charge the energy storage units of the motor vehicles 2 in a particularly time-efficient manner, the installation 10 has a conveyor system 5 by way of which the respective motor vehicle 2 is able to be conveyed automatically from a pickup area A at a distance from the charging stations 3, 4 to the respective charging station 3, 4, from at least a first of the charging stations 3, 4 to at least a second of the charging stations 3, 4 and from the respective charging station 3, 4 to a waiting area W at a distance from the charging stations 3, 4 and from the pickup area A. Hereinafter, the installation 1 and a method for charging the energy storage units are explained with reference to two of the motor vehicles 2, denoted K1 and K2, and with reference to two of the charging stations 3, 4, denoted L1 and L2. In the exemplary embodiment shown in FIG. 1, the charging stations 3 and thus the charging station L1 are in the form of fast-charging stations, and the charging stations 4 and thus L2 are in the form of normal charging stations. This should be understood to mean that the respective fast-charging station has a first maximum charging power for charging the respective energy storage unit. By way of example, the first maximum charging power is at least or exactly 350 kilowatts. The respective normal charging station has a second maximum charging power, lower than the first maximum charging power, for charging the respective energy storage unit, wherein the second maximum charging power is for example at least 100 kilowatts, in particular at least 200 kilowatts, lower than the first maximum charging power.

In the exemplary embodiment shown in FIG. 1, the conveyor system 5 is in the form of a platform or pallet system. In this case, the conveyor system 5 comprises conveyor platforms 6, which are also referred to as platforms or transport platforms and are for example in the form of pallets. The method and the installation 1 are explained below with reference to two of the conveyor platforms 6, denoted P1 and P2.

In order for example to charge the energy storage unit of the motor vehicle K1, the motor vehicle K1 to be charged, that is to say the motor vehicle K1 having the energy storage unit to be charged, is set down, in particular parked, in the pickup area A on the conveyor platform P1 located in the pickup area A by its driver. By way of example, the driver of the motor vehicle K1 drives the motor vehicle K1 forward or reverses it onto the conveyor platform P1 in the pickup area A. Before parking the motor vehicle K1 on the conveyor platform P1, while parking the motor vehicle K1 on the conveyor platform P1 and/or after parking the motor vehicle K1 on the conveyor platform P1, a current actual state of charge of the energy storage unit of the motor vehicle K1 is for example determined by way of the installation 1, in particular by way of an electronic computing apparatus of the installation 1. By way of example, the actual state of charge is determined, in particular detected, automatically, or the current actual state of charge is determined on the basis of information from the driver. By way of example, the motor vehicle K1 provides an information signal, in particular automatically, in particular wirelessly, wherein the information signal characterizes the current actual state of charge of the energy storage unit of the motor vehicle K1. The installation 1, in particular the electronic computing apparatus of the installation 1, receives the information signal and determines the current actual state of charge of the energy storage unit of the motor vehicle K1 prior to charging on the basis of the information signal. As an alternative or in addition, the installation 1 may comprise an input apparatus, not illustrated in more detail in FIG. 1, which is also referred to as a human-machine interface. The driver of the motor vehicle K1 for example performs an input into the installation 1 using the input apparatus, wherein the input of the driver is detected by way of the input apparatus. The current actual state of charge is determined on the basis of the input, which characterizes the current actual state of charge prior to charging. It is also conceivable for the driver to enter their charging aim, that is to say a target state of charge of the energy storage unit of the motor vehicle K1, into the input apparatus and thus, via the input apparatus, into the installation 1.

The target state of charge is a state of charge to which the energy storage unit of the motor vehicle K1 is brought or intended to be brought starting from the actual state of charge by virtue of the energy storage unit of the motor vehicle K1 being charged by way of the installation 1, that is to say by way of at least one of the charging stations 3, 4 of the installation 1. The charging of the respective energy storage unit of the respective motor vehicle 2 is also referred to as charging process, or takes place during a charging process. On the basis of the determined actual state of charge prior to charging and on the basis of the determined target state of charge, an energy requirement that is necessary to raise the actual state of charge to the target state of charge through the charging is determined for example by way of the installation 1, in particular by way of the electronic computing apparatus. The energy requirement is thus an amount of energy that needs to be supplied to the energy storage unit of the motor vehicle K2 by way of the installation 1 in order to bring the energy storage unit of the motor vehicle K2 from the actual state of charge to the target state of charge, accordingly to match the actual state of charge to the target state of charge. As an alternative or in addition, a charging time that is necessary to bring the energy storage unit of the motor vehicle K1 from the actual state of charge to the target state of charge through the charging of the energy storage unit of the motor vehicle K1 to be performed by way of the installation 1 is determined by way of the installation 1, in particular by way of the electronic computing apparatus of the installation 1. The abovementioned actual state of charge is also referred to as first actual state of charge that is determined by way of the installation 1 prior to charging of the energy storage unit of the motor vehicle K1. The energy requirement and/or the charging time characterizes what is known as a charging requirement, which is determined for the respective motor vehicle 2 by way of the installation 1.

It may be seen from FIG. 1 that the installation 1 also has an holding area ZB, also referred to as transfer area, in which motor vehicles to be charged, that is to say motor vehicles 2 having energy storage units to be charged, are temporarily parked, that is to say temporarily stored as it were. The holding area ZB is an area different from the charging stations 3, 4, from the pickup area A and from the waiting area W.

The motor vehicle K1 is first for example conveyed, in particular automatically, from the pickup area A to the and into the holding area ZB way of the conveyor platform P1, and first temporarily stored, that is to say temporarily parked, as it were, at least for a brief time in the holding area ZB, in particular while the driver of the motor vehicle K1 is located outside the motor vehicle K1. On the basis of the charging requirements of the motor vehicles 2 temporarily stored and waiting in the holding area ZB, and for example on the basis of a performance of the installation 1, also referred to as system or overall system, in particular with regard to charging, in particular simultaneously charging, the energy storage units, time sequences of the charging processes to be performed by way of the installation 1 to charge the energy storage units of the motor vehicles 2 are calculated, in particular by way of the electronic computing apparatus.

The motor vehicle K1 is in particular then first conveyed to the holding area ZB by way of the conveyor platform P1 and temporarily stored there if, at a time at which the motor vehicle K1 is parked on the conveyor platform P1, none of the charging stations 3, 4 are free and the only charging stations 3, 4 that are free are those for which it has been determined that they are not advantageous for charging the energy storage unit of the motor vehicle K1, that is to say when it has been determined that the energy storage unit of the motor vehicle K1 is able to be charged faster if the motor vehicle K1 is temporarily stored in the holding area ZB than if the motor vehicle K1 were to be conveyed directly from the pickup area A to one of the free charging stations 3, 4 and charged there.

In FIG. 1, transport routes, also referred to as roads or transport roads, of the installation 1 are also denoted by 7, these transport routes also being indicated by arrows in FIG. 1. The conveyor platforms 6 may be moved at least translationally along the transport routes 7, such that the motor vehicles 2 are able to be moved at least translationally and thus conveyed along the transport routes 7 by way of the conveyor platforms 6. It may also be seen from FIG. 1 that the respective conveyor platform 6 is able to be moved rotationally and in the process rotated in particular about a respective axis of rotation running in the vertical direction, as a result of which the respective motor vehicle 2 parked on the respective conveyor platform 6 is able to be rotated. It may be seen that the respective conveyor platform 6 is able to be moved at least translationally relative to the charging stations 3, 4, in particular along the respective transport route 7, as a result of which the respective motor vehicle 2 is accordingly able to be moved at least translationally. The respective conveyor platform 6 in the exemplary embodiment shown in FIG. 1 may furthermore be rotated about a respective axis of rotation, running in the vertical direction, relative to the respective charging station 3, 4, as a result of which the respective motor vehicle 2 is also able to be rotated. The motor vehicle 2 may thereby be conveyed in a needs-oriented and space-saving manner. Furthermore, in FIG. 1, an area for moving, in particular displacing, the conveyor platform 6 is denoted by F.

As may be seen from FIG. 1, the motor vehicle K2 is first charged by way of the charging station L1, and for example a third one of the motor vehicles 2, denoted by K3, is charged by way of the charging station L2. By way of example, the installation 1 determines that the motor vehicle K3 or its energy storage unit will soon, that is to say in the near future, have reached the target state of charge, and it is determined that the energy storage unit of the motor vehicle K2 will soon have such an actual state of charge, resulting from the state of charge, that a highest possible or fastest possible charging power with which the energy storage unit of the motor vehicle K2 is able to be charged by way of the charging station L1 will drop below a threshold value. If the energy storage unit of the motor vehicle K3 has reached its target state of charge, then the motor vehicle K3 is conveyed from the charging station L2 to the waiting area W by way of the conveyor platform 6 on which the motor vehicle K3 is parked, from which waiting area the driver of the motor vehicle K3 is able to pick up the motor vehicle K3 and drive it away. Then, when the in particular current charging power of the charging station L1 falls below the threshold value, the motor vehicle K2 is conveyed automatically from the charging station L1 to the charging station L2 by way of the conveyor platform P2. The energy storage unit of the motor vehicle K2 is then charged by way of the charging station L2, in particular until the energy storage unit of the motor vehicle K2 has the desired target state of charge. Since the charging station L1 is free as a result of the motor vehicle K2 being conveyed automatically from the charging station L1 to the charging station L2, the motor vehicle K1 is conveyed automatically from the holding area ZB to the charging station L1 by way of the conveyor platform P1. The energy storage unit of the motor vehicle K1 is supplied with electrical energy and thereby charged by way of the charging station L1. Since for example the actual state of charge of the energy storage unit of the motor vehicle K1 determined prior to charging of the energy storage unit of the motor vehicle K1 was very low, the energy storage unit of the motor vehicle K1 is able to be charged, by way of the charging station L1, with a charging power that corresponds to the first maximum charging power or deviates only slightly from the first maximum charging power, and is accordingly not lower than the threshold value.

If for example the energy storage unit of the motor vehicle K2 has been charged by way of the charging station L2 such that the energy storage unit of the motor vehicle K2 has the target state of charge, and if the motor vehicle K2 is not picked up by the driver of the motor vehicle and driven away immediately from the charging station L2 after the charging has ended and within a predefinable or predefined waiting time, then the motor vehicle K2 is conveyed from the charging station L2 to the waiting area W by way of the conveyor platform P2. The driver of the motor vehicle K2 may then pick up the motor vehicle K2 from there and drive it away, that is to say drive it down from the conveyor platform P2.

It may be seen that the respective driver, once they have parked the respective motor vehicle 2 in the pickup area A on the conveyor platform 6, may get out of the motor vehicle 2 and may stay outside the respective motor vehicle 2 during the respective charging. After the respective charging or charging process has ended, the driver may return to their motor vehicle 2 and pick up their motor vehicle 2 either from the respective charging station 3, 4 or from the waiting area W and drive it away.

An output apparatus 8 of the installation 1 is arranged next to the pickup area A, wherein the output apparatus 8 has an electrical or electronic display 9. An optical signal is displayed and thus output on the display 9 and characterizes or displays a starting time at which the charging of the energy storage unit of the motor vehicle 2 currently located in the pickup area A on the conveyor platform 6 arranged there will begin. The starting time is in particular displayed upon entry into the installation 1 or on the conveyor platform 6 arranged in the pickup area A. The signal is thus information based on which it is possible to communicate, to the driver of the motor vehicle 2 located in the pickup area A, when their motor vehicle 2 will provisionally be conveyed to one of the charging stations 3, 4 and when the charging will begin there.

By way of example, a second current actual state of charge of the energy storage unit of the motor vehicle K1 is determined by way of the installation 1 during charging of the energy storage unit of the motor vehicle K1. The installation 1 in this case provides data, in particular wirelessly, that characterize a current state of the motor vehicle K1 during charging of the energy storage unit of the motor vehicle K1. By way of example, the data are transmitted, in particular wirelessly, to a mobile terminal of the driver of the motor vehicle K1, in particular while the driver of the motor vehicle K1 is located outside the motor vehicle K1. An electronic computing apparatus of the mobile terminal, which is for example in the form of a cell phone or smartphone, of the driver of the motor vehicle K1 executes an application, also referred to as app or software app, using which the data provided by the installation 1 are received. The current state of the motor vehicle K1, in particular during charging, is displayed on an in particular electronic or electrical display of the mobile terminal. The current state comprises for example the second current actual state of charge of the energy storage unit of the motor vehicle K1. The current second actual state of the energy storage unit of the motor vehicle K1 is thus for example displayed on the display of the mobile terminal. As an alternative or in addition, a starting time and/or an end time of the charging process for charging the energy storage unit of the motor vehicle K1 is displayed on the display of the mobile terminal. The starting time is in this case the time at which the charging of the energy storage unit of the motor vehicle K1 started, and the end time is an in particular provisional time at which the charging process for charging the energy storage unit of the motor vehicle K1 will, in particular provisionally, end.

It is also conceivable for information about current waiting times, for example for which it is necessary for the drivers to wait until the charging processes for charging the energy storage units are started, to be made available via a server, also referred to as backend and for example external to the installation 1, in particular to route planners, navigation systems and/or software applications that are executed for example on mobile terminals. Charging processes may thereby be planned expediently.

As soon as a fast-charging space, such as for example the charging station L1, is free, the motor vehicle K1 to be charged is conveyed to the charging station L1 without involvement of the driver or of staff, in particular by way of the conveyor platform P1 on which the motor vehicle K1 is parked. Once the motor vehicle K1 has arrived at the charging station L1, the motor vehicle K1, or its energy storage unit, is connected to the charging station L1, automatically or manually, via a cable 10. To this end, for example, respective contact elements of the cable 10 and of the motor vehicle K1 are plugged into one another.

An order in which the motor vehicles 2 are charged may be determined according to an order in which the motor vehicles 2 drove into the installation 1 and/or parked on the conveyor platform 6, or according to another strategy. It is conceivable for certain vehicles, such as for example rescue vehicles or emergency services vehicles, to have priority over other vehicles or types of vehicles, and/or a corresponding pricing system could offer shorter waiting times or to shorten waiting times.

The motor vehicle K1, in particular depending on the operating strategy or depending on the degree of use of the installation 1, for example remains at or in the charging station L1 until for example the energy storage unit of the motor vehicle K1 has reached its target state of charge or the charging power with which the energy storage unit of the motor vehicle K1 is charged by way of the charging station L1 has fallen below a defined or predefinable or predefined minimum or level. If this is the case, then the motor vehicle K1 is conveyed automatically from the charging station L1 to a free one of the charging stations 4, by way of example to the charging station L2, by way of the conveyor platform P1, in particular after the motor vehicle K2 has been conveyed away from there by way of the conveyor platform P2 and has for example been conveyed to the waiting area W. The charging of the energy storage unit of the motor vehicle K1 is then finished by way of the charging station 4, in particular the charging station L2, that is to say it is charged until the energy storage unit of the motor vehicle K1 has the target state of charge.

Once the energy storage unit of the motor vehicle K1 has reached its target state of charge, also referred to as setpoint state of charge, the motor vehicle K1 is driven away from the charging station L1 or from one of the charging stations 4, in particular from the charging station L2, or, if this does not happen within the waiting time, is conveyed to the waiting area W by way of the conveyor platform P1 and parked in said waiting area.

The installation 1 is designed such that the vehicles are able to be driven manually to any parking space, that is to say to any position, and thus for example from each charging station 3, 4, from the holding area ZB and from the waiting area W, that is to say from the respective conveyor platform 6. The installation 1 is thus robust to faults and offers flexibility for last-minute changes of plan of users or installation operators.

The following is also conceivable: By way of example, the installation 1 determines a current actual charging power with which for example the energy storage unit of the motor vehicle K3 is being charged by way of the charging station L2. If it is determined for example that the current actual charging power with which the energy storage unit of the motor vehicle K3 is currently being charged by way of the charging station L2 (normal charging station) has fallen below the second maximum charging power of the charging station L2, that is to say is lower than the second maximum charging power, then the energy storage unit of the motor vehicle K3 may be charged further by way of the charging station L2, in particular until the energy storage unit of the motor vehicle K3 has reached its target state of charge. Transporting of the motor vehicle K3 to one of the charging stations 3 (fast-charging stations), in order to charge the energy storage unit of the motor vehicle K3 by way of the one charging station 3, is thus avoided, since this would not bring about any technical advantage, since the first maximum charging power of the one charging station 3, which is higher than the second maximum charging power of the charging station L2, is no longer able to be used to charge the energy storage unit of the motor vehicle K3 faster than by way of the charging station L2. In other words, the energy storage unit of the motor vehicle K3 would not be able to be charged faster by way of one of the fast-charging stations than by way of the charging station L2, and so the motor vehicle K3 may remain at the charging station L2 and be charged to completion there.

LIST OF REFERENCE SIGNS

1 Installation
2 Motor vehicle
3 Charging station
4 Charging station
5 Conveyor system
6 Conveyor platform
7 Transport route
8 Output apparatus
9 Display
10 Cable
A Pickup area
F Area
K1 Motor vehicle
K2 Motor vehicle
K3 Motor vehicle
L1 Charging station
L2 Charging station
P1 Conveyor platform
P2 Conveyor platform
W Waiting area
ZB Holding area

The invention claimed is:

1. An installation for charging electrical energy storage units of motor vehicles, the installation comprising:
a plurality of charging stations by way of which the energy storage units are suppliable with electrical energy and are thereby chargeable; and
a conveyor system by way of which a respective motor vehicle is conveyable automatically from a pickup area at a first distance from the plurality of charging stations to a respective charging station, from at least a first charging station of the plurality of charging stations to at least a second charging station of the plurality of charging stations and from the respective charging station to a waiting area at a second distance from the plurality of charging stations and from the pickup area, wherein:
the first charging station is in a form of a fast-charging station that has a first maximum charging power for charging a respective energy storage unit,
the second charging station has a second maximum charging power, which is lower than the first maximum charging power, for charging the respective energy storage unit, and
the installation is configured to convey the respective motor vehicle automatically from the first charging station to the second charging station upon determining that the respective energy unit can no longer be charged with the first maximum charging power.

2. The installation according to claim 1, wherein:
the conveyor system has at least one conveyor platform that is movable at least translationally from the pickup area to the respective charging station, from the first charging station to the second charging station and from the respective charging station to the waiting area, and
the respective motor vehicle is parkable on the conveyer system and is conveyable from the pickup area to the respective charging station, from the first charging station to the second charging station and from the respective charging station to the waiting area.

3. The installation according to claim 1, wherein:
the installation is configured to determine at least one of an actual state of charge of a respective energy storage unit, a target state of charge of the respective energy storage unit, or a current actual charging power for charging the respective energy storage unit.

4. The installation according to claim 3, wherein:
the installation is further configured to convey the respective motor vehicle automatically at least one of:
from the pickup area to the respective charging station, or
from the respective charging station to the waiting area, by way of the conveyor system based on at least one of the actual state of charge, the target state of charge, or the current actual charging power.

5. The installation according to claim 3, wherein:
the installation is configured, based at least on the actual state of charge and the target state of charge, to determine a charging time that is necessary to bring the actual state of charge to the target state of charge through charging.

6. The installation according to claim 5, wherein:
the installation is configured to transmit the charging time to at least one device external to the installation.

7. The installation according to claim 5, wherein:
the installation is configured to transmit the charging time to at least one device external to the installation wirelessly.

8. The installation according to claim 1, wherein:
the installation is configured to transmit data to at least one mobile terminal external to the installation, and
the data characterize a current state of the respective motor vehicle during charging of the energy storage unit of the respective motor vehicle.

9. The installation according to claim 1, wherein:
the installation is configured to transmit data to at least one mobile terminal external to the installation wirelessly, and the data characterize a current state of the respective motor vehicle during charging of the energy storage unit of the respective motor vehicle.

10. The installation according to claim 1, wherein:
the installation has at least one output apparatus arranged at or in the pickup area, by way of which at least one output apparatus an optical signal is outputtable, and
the optical signal characterizes a starting time at which charging of the energy storage unit of a motor vehicle currently located in the pickup area will begin.

11. A method for charging electrical energy storage units of motor vehicles, wherein the energy storage units are supplied with electrical energy by way of a plurality of charging stations of an installation and are charged by way of the plurality of charging stations, the method comprising:
conveying a respective motor vehicle automatically from a pickup area at a distance from the charging stations to the respective charging station, from at least a first charging station of the plurality of charging stations to at least a second charging station of the plurality of charging stations and from the respective charging station to a waiting area at a distance from the plurality of charging stations and from the pickup area by way of a conveyor system of the installation, wherein:
the first charging station is in a form of a fast-charging station that has a first maximum charging power for charging a respective energy storage unit,
the second charging station has a second maximum charging power, which is lower than the first maximum charging power, for charging the respective energy storage unit, and
the respective motor vehicle is automatically conveyed from the first charging station to the second charging station upon determining that the respective energy unit can no longer be charged with the first maximum charging power.

\* \* \* \* \*